US012794686B2

(12) United States Patent
Glaser et al.

(10) Patent No.: US 12,794,686 B2
(45) Date of Patent: Nov. 10, 2026

(54) SYSTEM FOR ACCESS CONTROL

(71) Applicant: NVIDIA CORPORATION, Santa Clara, CA (US)

(72) Inventors: Stephen David Glaser, San Francisco, CA (US); Eric Tyson, Santa Clara, CA (US); Jonathon Evans, Santa Clara, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 25 days.

(21) Appl. No.: 18/894,919

(22) Filed: Sep. 24, 2024

(65) Prior Publication Data

US 2025/0125953 A1 Apr. 17, 2025

Related U.S. Application Data

(60) Provisional application No. 63/543,980, filed on Oct. 13, 2023.

(51) Int. Cl.
*H04L 9/08* (2006.01)
*H04L 9/32* (2006.01)

(52) U.S. Cl.
CPC .......... *H04L 9/0866* (2013.01); *H04L 9/0825* (2013.01); *H04L 9/3247* (2013.01)

(58) Field of Classification Search
CPC ... H04L 9/0866; H04L 9/0825; H04L 9/3247; H04L 9/0841
See application file for complete search history.

(56) References Cited

U.S. PATENT DOCUMENTS

| | | | | |
|---|---|---|---|---|
| 11,658,803 | B2 | 5/2023 | Pismenny et al. | |
| 2013/0343179 | A1* | 12/2013 | Madaiah | H04L 41/0654 370/222 |
| 2014/0237576 | A1* | 8/2014 | Zhang | G06F 21/32 726/7 |
| 2017/0041147 | A1* | 2/2017 | Krahn | H04L 9/0877 |
| 2023/0176993 | A1* | 6/2023 | Thomas | G06F 13/404 710/105 |
| 2024/0250868 | A1 | 7/2024 | Bashan et al. | |

OTHER PUBLICATIONS

Weiner et al., Pending U.S. Appl. No. 18/943,347, filed Nov. 11, 2024.
Patki et al., Pending U.S. Appl. No. 18/372,773, filed Sep. 26, 2023.
Glaser et al., Pending U.S. Appl. No. 18/809,586, filed Aug. 20, 2024.

* cited by examiner

*Primary Examiner* — Mohammad W Reza
(74) *Attorney, Agent, or Firm* — Alston & Bird LLP

(57) ABSTRACT

Systems, computer program products, and methods are described for an endpoint device configured for secure data transmission within a network. An example endpoint device may include a network interface configured to receive a communication request from a peer endpoint device, and an access control unit configured to determine whether a peer endpoint device is IDE qualified based on the communication request. If the peer endpoint device is IDE qualified, the access control unit authorizes the communication request, allowing secure communication between the devices. If the peer endpoint device is not IDE qualified, the access control unit transmits the communication request to a root port for further authorization, verifying that only IDE-qualified devices are permitted to communicate directly.

20 Claims, 5 Drawing Sheets

SYSTEM FOR ACCESS CONTROL

CROSS-REFERENCE TO RELATED APPLICATIONS

This application claims priority to U.S. Application No. 63/543,980, filed Oct. 13, 2023, the content of which is hereby incorporated by reference in its entirety.

TECHNOLOGICAL FIELD

Example embodiments of the present disclosure relate to the field of data security in high-speed interconnect technologies, specifically focusing on improving security protocols within computing environments with Peripheral Component Interconnect Express (PCIe) frameworks.

BACKGROUND

The development of high-speed interconnect technologies such as Peripheral Component Interconnect Express (PCIe) and Compute Express Link (CXL) has facilitated the rapid expansion of data-driven applications in cloud computing, artificial intelligence, analytics, edge computing domains, and/or the like. Concurrently, this development has introduced security challenges, notably concerning data integrity and confidentiality.

Applicant has identified a number of deficiencies and problems associated with existing security methods concerning controllability and performance. Many of these identified problems have been solved by developing solutions that are included in embodiments of the present disclosure, many examples of which are described in detail herein.

BRIEF SUMMARY systems, methods, and computer program products are therefore provided for integrating selective components of the Integrity and Data Encryption (IDE) mechanism into the Access Control Services (ACS) framework at endpoint devices within a network.

In one aspect, an endpoint device configured for secure data transmission is presented. The endpoint device comprising: a network interface configured to receive a communication request from a peer endpoint device; an access control unit operatively coupled to the network interface, and configured to: determine, based on the communication request, whether the peer endpoint device is Integrity and Data Encryption (IDE) qualified; in an instance in which the peer endpoint device is IDE qualified, authorize the communication request; and in an instance in which the peer endpoint device is not IDE qualified, transmit the communication request to a root port to authorize the communication request.

In some embodiments, the endpoint device further comprises a communication authorization unit operatively coupled to the access control unit, wherein the communication authorization unit is configured to: establish a key setup and exchange component with the peer endpoint device prior to receiving the communication request from the peer endpoint device, wherein determining that the peer endpoint device is IDE qualified comprises determining that the key setup and exchange component is established.

In some embodiments, in establishing the key setup and exchange component, the communication authorization unit is further configured to: generate a first set of cryptographic keys for the endpoint device, wherein the first set of cryptographic keys comprises a first public key and a first private key; transmit the first public key to the peer endpoint device; receive, from the peer endpoint device, a second public key associated with the peer endpoint device; and store the second public key in a secure memory location.

In some embodiments, the communication authorization unit is further configured to: extract a digital signature associated with the peer endpoint device from the communication request; decrypt the digital signature associated with the peer endpoint device using the second public key to obtain a transmitted hash associated with the communication request; determine a computed hash associated with the communication request; and in an instance in which the transmitted hash matches the computed hash, determine that the communication request is authentic.

In some embodiments, the communication authorization unit is further configured to: generate a first shared secret key based on the first private key and the second public key; transmit the first shared secret key to the peer endpoint device; receive, from the peer endpoint device, a second shared secret key associated with the peer endpoint device, wherein the second shared secret key is generated using the first public key and the second private key at the peer endpoint device; and establish a secure communication channel between the endpoint device and the peer endpoint device based on the first shared secret key and the second shared secret key, wherein the first shared secret key matches the second shared secret key, and wherein determining that the peer endpoint device is IDE qualified comprises determining that the secure communication channel is established.

In some embodiments, the access control unit is further configured to: deny the communication request in an instance in which the peer endpoint device is not IDE qualified.

In some embodiments, the access control unit is further configured to authorize the communication request with the peer endpoint device according to a peer-to-peer model.

In some embodiments, authorizing the communication request according to the peer-to-peer model comprises excluding communication with other peer devices.

In another aspect, a method for secure data transmission is presented. The method comprising: receiving, at an endpoint device, a communication request from a peer endpoint device via a network interface; determining, based on the communication request, whether the peer endpoint device is Integrity and Data Encryption (IDE) qualified; authorizing the communication request if the peer endpoint device is IDE qualified; and transmitting the communication request to a root port for authorization if the peer endpoint device is not IDE qualified.

In yet another aspect, a computer program product for secure data transmission is presented. The computer program product comprising a non-transitory computer-readable medium comprising code, that when executed by a processor, cause an apparatus to: receive, at an endpoint device, a communication request from a peer endpoint device; determine, based on the communication request, whether the peer endpoint device is Integrity and Data Encryption (IDE) qualified; in an instance in which the peer endpoint device is IDE qualified, authorize the communication request; and in an instance in which the peer endpoint device is not IDE qualified, transmit the communication request to a root port to authorize the communication request.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
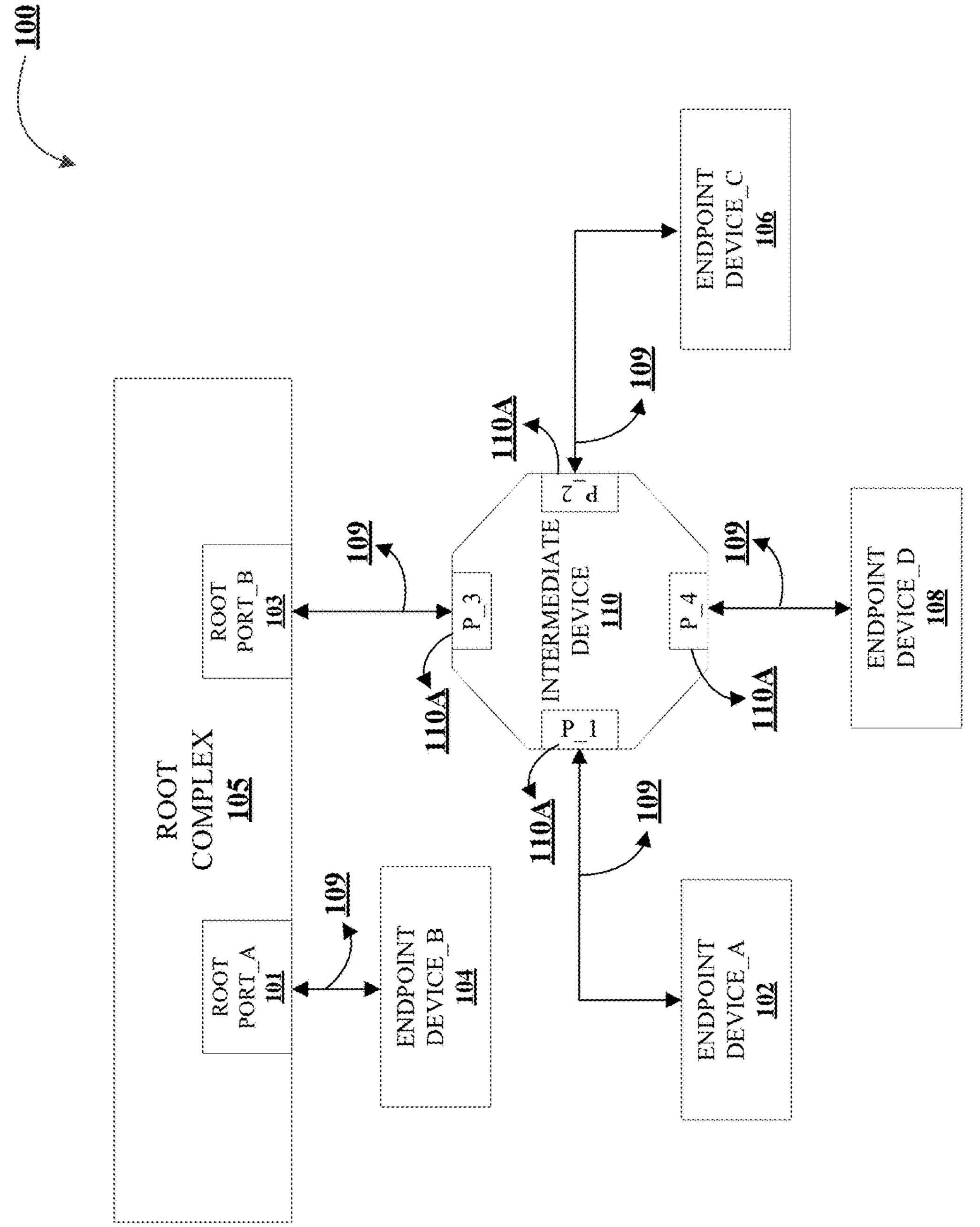
FIG. 1 illustrates an example system environment for secure access control, in accordance with an embodiment of the present disclosure.

The IDE mechanism has been developed to secure encrypted data transmission within these interconnect frameworks. IDE's primary function is to encrypt data packets, specifically Transaction Layer Packets (TLPs), such that that information remains secure and unaltered during transmission between different endpoint devices within a computing environment. IDE is used to maintain data integrity (assuring that data is accurate and unchanged from its original form) and confidentiality (such that that sensitive information remains accessible only to authorized entities). IDE operates by applying cryptographic algorithms to data packets, thus providing a layer of protection against unauthorized access and tampering. While IDE offers robust security benefits, it can also introduce significant overhead and performance penalties due to the computational intensity of encryption processes.

ACSs operate based on a set of predefined rules that govern the routing and access permissions for various endpoint devices, switches, and/or root ports within a network. By enforcing these rules, ACS prevent unauthorized access and potential security breaches.

Embodiments of the disclosure propose a security mechanism that integrates specific components of IDE into the existing endpoint ACS framework without overhead heavy IDE components such as the IDE encryption requirement. Specifically, endpoint devices may be configured to implement specific IDE components, such as key setup and exchange, without engaging in the actual encryption of data. By bypassing the overhead heavy mechanisms such as encryption and state tracking components of IDE, embodiments of the disclosure retain the security benefits of IDE, such that that only authorized devices that have successfully completed the specific IDE components can communicate, while significantly reducing power consumption and performance penalties.

In an example implementation, endpoint devices may implement specific IDE components such as IDE key setup and exchange to authenticate each other. A new endpoint security check is then established with a receiving endpoint device to determine whether a transmitting endpoint device is IDE-qualified, meaning the transmitting endpoint device has successfully conducted the key setup and exchange with the receiving endpoint device prior to transmitting a communication request. Only transactions meeting this criterion are permitted. As such, embodiments of the disclosure provide a robust security solution for datacenter environments by integrating essential elements of IDE into ACS at the endpoint devices. In doing so, the solution effectively prevents unauthorized device infiltration while mitigating the overhead typically associated with full IDE implementation.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may mean that the components are electronically or optically coupled and/or are in electrical or optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "interconnected" may imply that each component is directly or indirectly linked to every other component or switch in the network, allowing for seamless data transfer and communication between all the components.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

It should be understood that the word "exemplary" is used herein to mean "serving as an example, instance, or illustration." Any implementation described herein as "exemplary" is not necessarily to be construed as advantageous over other implementations.

Furthermore, as would be evident to one of ordinary skill in the art in light of the present disclosure, the terms "substantially" and "approximately" indicate that the referenced element or associated description is accurate to within applicable engineering tolerances.

Example System Environment

FIG. 1 illustrates an example system environment 100 for secure access control, in accordance with an embodiment of the present disclosure. In the context of the present disclosure, the system environment 100, as depicted in FIG. 1, may be configured for the facilitation of secure access control through a high-speed interconnect framework or fabric. Specifically, the system environment 100 may utilize a PCIe fabric, a serial computer expansion bus standard, to establish a network of devices (e.g., endpoint devices, intermediate devices and/or the like as described in more detail herein) for the purpose of secure data communication. The architecture of the PCIe fabric offers a scalable, point-to-point topology enabling direct, secure communication links between endpoint devices, between intermediate devices, and/or between endpoint devices and intermediate device. As such, the focus of the disclosure, in specific embodiments, is on enhancing the security of peer-to-peer communications within high-speed interconnect networks, such as those utilizing PCIe, by integrating selective elements of the IDE mechanism into the ACS framework at the endpoint level, enabling secure communication between authorized devices while minimizing the overhead associated with full IDE implementation within the system environment 100. FIG. 1 illustrates only one example of an embodiment of the system environment 100, and it will be appreciated that in other embodiments one or more of the systems, units, and/or devices may be combined into a single system, unit, or device or be made up of multiple systems, units, or devices. Furthermore, it is to be understood that reference to the PCIe fabric is illustrative rather than prescriptive. The system environment 100 described need not be limited to PCIe fabric and can accommodate alternative high-speed interconnect technologies, such as CXL. In such cases, the configuration of the system environment 100 may be modified to meet the specific requirements of any chosen high-speed interconnect technology.

As shown in FIG. 1, the system environment 100 may include a plurality of endpoint devices 102, 104, 106, 108, an intermediate device 110, and a root complex 105. The plurality of endpoint devices 102, 104, 106, 108 may refer to devices that act as terminal points of communication within the PCIe fabric. As such, the plurality of endpoint devices 102, 104, 106, 108 may be peripherals that are being connected to the system, such as network cards, graphical processing units (GPUs) network interface cards (NICs), storage controllers/adapters, field programmable gate array (FPGA) accelerators, sound cards/audio interfaces, artificial intelligence (AI)/machine learning (ML) accelerators, and/or the like. In specific embodiments, the plurality of endpoint devices 102, 104, 106, 108 may not relay data from other devices; instead, they may either generate or consume data. On the other hand, the intermediate device 110, as shown in FIG. 1, may refer to a switch device within the PCIe fabric, which can route data between different points in the system environment 100, including between multiple endpoint devices. As shown in FIG. 1, the intermediate device 110 may include switch ports P_1, P_2, P_3, and P_4 110A. Switch Port P_1 may be used to connect endpoint device_A 102 to the intermediate switch 110, Switch Port P_2 may be used to connect endpoint device_C 106 to the intermediate switch 110, Switch Port P_3 may be used to connect root port_B 103 to the intermediate switch 110, and Switch Port P_4 may be used to connect endpoint device_D 108 to the intermediate switch 110. As such, the intermediate device 110 may manage the flow of information between the plurality of endpoint devices 102, 104, 106, 108 and potentially other components within the system environment 100.

In specific embodiments, ACS Source Validation is implemented on the downstream ports of the intermediate device 110, specifically on ports P_1, P_2, P_3, and P_4, for additional security measures. By enabling ACS Source Validation, each downstream port may verify that the Requester IDs (RIDs) received correspond to the expected ones for the attached device. Implementing such a mechanism prevents unauthorized devices from masquerading as legitimate, pre-verified devices by duplicating their RIDs. If a downstream port, such as P_1 or P_2, detects a mismatched or unexpected RID, it will reject the transaction, thereby preventing malicious activities. This layer of security strengthens the robustness of the overall security solution within the high-speed interconnect framework. It should be understood, however, that the present disclosure contemplates that the system environment 100 may be configured without ACS Source Validation, or with alternative security measures, without departing from the scope and spirit of the disclosure. The decision to enable or disable ACS Source Validation may depend on specific design considerations or application requirements, as determined by those skilled in the art.

The root complex 105 may be a primary interface within the PCIe fabric that is used to connect peripheral devices, such as the plurality of endpoint devices 102, 104, 106, 108 and the intermediate device 110, to the PCIe fabric. The root complex may be configured to manage the communication between external components (e.g., a host processor) and the peripheral devices. The root complex may include root ports 101, 103 that allow the root complex 105 to interface with the peripheral devices, manage a configuration for discovering and configuring peripheral devices, and manage data paths for routing data between the external components and the peripheral devices.

The plurality of end-point devices 102, 104, 106, 108, the intermediate device 110, and the root complex 105 may be operatively coupled via communication links 109. The communication links 109 may represent physical or logical connections that enable data exchange between endpoint devices (e.g., Endpoint Device_A 102, Endpoint Device_B 104, Endpoint Device_C 106, and Endpoint Device_D 108), the Intermediate Device 110, and the Root Complex 105, which includes Root Ports A 101 and B 103. The communication links 109 may comprise various types of interconnects, such as electrical, optical, or other suitable media that support high-speed data transfer within the PCIe fabric. These links are designed to carry TLPs or other types of data packets, facilitating the transfer of information between devices. In some embodiments, communication links 109 may include PCIe lanes, which provide a scalable and flexible means of communication that can support varying levels of bandwidth requirements depending on the specific needs of the connected devices. Furthermore, the communication links 109 may be configured to support both direct and indirect routing of data. For example, a communication link 109 directly connecting an endpoint device (e.g., Endpoint Device_B 104) to a root port (e.g., Root Port_A 101) may provide a controlled and secure data path, such that that data is transmitted through the Root Complex 105, which manages and verifies the communication according to established security protocols. Conversely, communication links 109 connecting endpoint devices through the Intermediate Device 110 (e.g., links between Endpoint Device_C 106 and Endpoint Device_D 108 via the Intermediate Device 110) may enable a peer-to-peer communication model, allowing data to bypass the root complex and be routed directly between endpoint devices.

As such, the communication links 109 may support flexible and efficient network topology configurations within the system environment 100, accommodating both the need for high-speed, low-latency data transfer and robust security measures. Depending on the configuration and security requirements, communication links 109 may be utilized in various modes to either enhance performance by leveraging direct peer-to-peer communication or to reinforce security by routing data through controlled paths via the root complex.

In a peer-to-peer communication system, endpoint devices can either connect directly to root ports or be interconnected through intermediary switches. In conventional peer-to-peer frameworks, data transmitted between devices may pass through other intermediary devices due to their shared connections, creating potential security vulnerabilities, as unauthorized devices could access or intercept the data. Conversely, routing communications through a root port enhances security by providing a more controlled path, but this comes at the cost of reduced communication efficiency due to increased latency and overhead. The peer-to-peer model offers more direct and faster communication by bypassing the root port; however, this efficiency can introduce risks, such as unauthorized access by intermediary devices within the system environment 100.

For example, in the system environment 100 shown in FIG. 1, endpoint devices, such as Endpoint Device_A 102 and Endpoint Device_B 104, may connect directly to root ports (Root Port_A 101 and Root Port_B 103) within the Root Complex 105, facilitating secure communication through a controlled path. However, endpoint devices, such as Endpoint Device_C 106 and Endpoint Device_D 108, may connect through an Intermediate Device 110, which acts as a switch. In a peer-to-peer communication model, data transmission between Endpoint Device_C 106 and Endpoint Device_D 108 may pass through the Intermediate Device 110 due to their shared connections. This shared pathway could expose communications to security vulnerabilities, as the Intermediate Device 110 could potentially access or intercept the data. On the other hand, if communication between Endpoint Device_C 106 and Endpoint Device_D 108 is routed through the Root Complex 105, passing through Root Port_B 103, to perform necessary security checks that confirm whether the two endpoint devices are permitted to communicate with each other. However, this could reduce communication efficiency, introducing latency and increased overhead. The peer-to-peer model, which allows Endpoint Device_C 106 to communicate directly with Endpoint Device_D 108 via the Intermediate Device 110, provides faster and more efficient communication by bypassing the root complex. Nevertheless, this approach may expose the data to risks associated with unauthorized access by the intermediate device within the system environment 100.

In conventional PCIe-based systems, the ACS configuration is responsible for managing and enforcing security policies that govern communication between endpoint devices and other components within a network. Conventional ACS configurations have relied on various security models, each with distinct levels of trust and control mechanisms, to manage access and protect against unauthorized data interception or manipulation. These security models include Indiscriminate Acceptance of All Transactions ("Believe Everything"), Reliance on Specific PCIe Routing Functions or Translation Agents ("Believe Everyone's PF/TA"), Exclusive Trust in the CPU or Policies Enforced by the Input/Output Memory Management Unit (IOMMU) ("Only Believe the CPU/IOMMU Policy"), Trust Limited to a Trusted Execution Environment (TEE) Alone ("Believe TEE Alone"), and/or the like.

The "Believe Everything" approach adopts a permissive security stance, where all transactions from any endpoint device are automatically accepted without thorough verification. Under this model, the ACS does not enforce any specific security checks or validations, assuming that all devices in the network are trustworthy. While this model simplifies communication and reduces overhead, it can introduce significant security vulnerabilities, as it allows any device to communicate freely, potentially exposing the system to unauthorized access, data breaches, or malicious activities. In "Believe Everyone's PF/TA" model, security is based on trusting specific physical functions (PFs) or translation agents (TAs) within the PCIe routing architecture. Each endpoint device has a designated PF or TA that is assumed to handle data routing securely. The ACS configuration relies on these entities to enforce routing policies and prevent unauthorized transactions. However, this model still carries risks, as any compromise of a PF or TA could lead to unauthorized access or data manipulation, especially if the PF/TA is not adequately secured or is susceptible to vulnerabilities. The "Only Believe the CPU/IOMMU Policy" approach centralizes trust within the CPU or relies on the IOMMU's policies to enforce access control. The IOMMU is a component that manages memory access and translation for I/O devices, providing a layer of security by ensuring that devices only access authorized memory regions. Under this model, the ACS configuration trusts only the CPU's commands or the IOMMU's rules to authorize or deny transactions, thereby improving security by centralizing control and minimizing the risk of unauthorized access. However, the policy can introduce performance bottlenecks, as all transactions must be processed or validated through the CPU or IOMMU, potentially leading to increased latency and reduced communication efficiency. The "Believe TEE Alone" model confines trust to a Trusted Execution Environment (TEE), a secure area within the processor that runs isolated code and protects data integrity and confidentiality. The ACS configuration under this model assumes that only transactions originating from or destined for the TEE are trustworthy. The TEE provides a robust security layer by isolating sensitive computations and data from the rest of the system, reducing the risk of exposure to malicious software or attacks. However, this approach limits the flexibility of the system, as only specific transactions that interact with the TEE are allowed, potentially excluding other legitimate communications or requiring additional overhead to manage TEE interactions.

Each of these conventional security models within ACS configurations presents a trade-off between security and performance. More permissive models, like "believe everything" or "believe everyone's PF/TA," offer higher performance with minimal overhead but pose significant security risks due to their lack of stringent verification. On the other hand, more restrictive models, such as "only believe the CPU/IOMMU policy" or "believe TEE alone," provide stronger security assurances by enforcing strict access controls and isolation but may incur higher latency and computational overhead, reducing overall system efficiency.

Embodiments of the disclosure aim to balance the trade-offs between security and performance in PCIe-based systems by selectively integrating components of the IDE mechanism into the existing ACS framework. By incorporating specific IDE elements, such as key setup and exchange protocols, these embodiments enable secure communication between endpoint devices while avoiding the overhead associated with full IDE encryption processes. Such integration ensures that only authorized devices can engage in peer-to-peer communication, thereby enhancing data protection against unauthorized access or interception. At the same time, it maintains the efficiency and performance benefits inherent in direct communication models by minimizing additional computational and latency burdens typically imposed by comprehensive encryption methods.

It is to be understood that the structure of the system environment 100 and its components, connections and relationships, and their functions, are meant to be exemplary only, and are not meant to limit implementations of the disclosures described and/or claimed in this document. In one example, the system environment 100 may include more, fewer, or different components. In another example, some or all of the portions of the system environment 100 may be combined into a single portion or all of the portions of the environment 100 may be separated into two or more distinct portions.

Example Endpoint Device Circuitry

Figure 2:
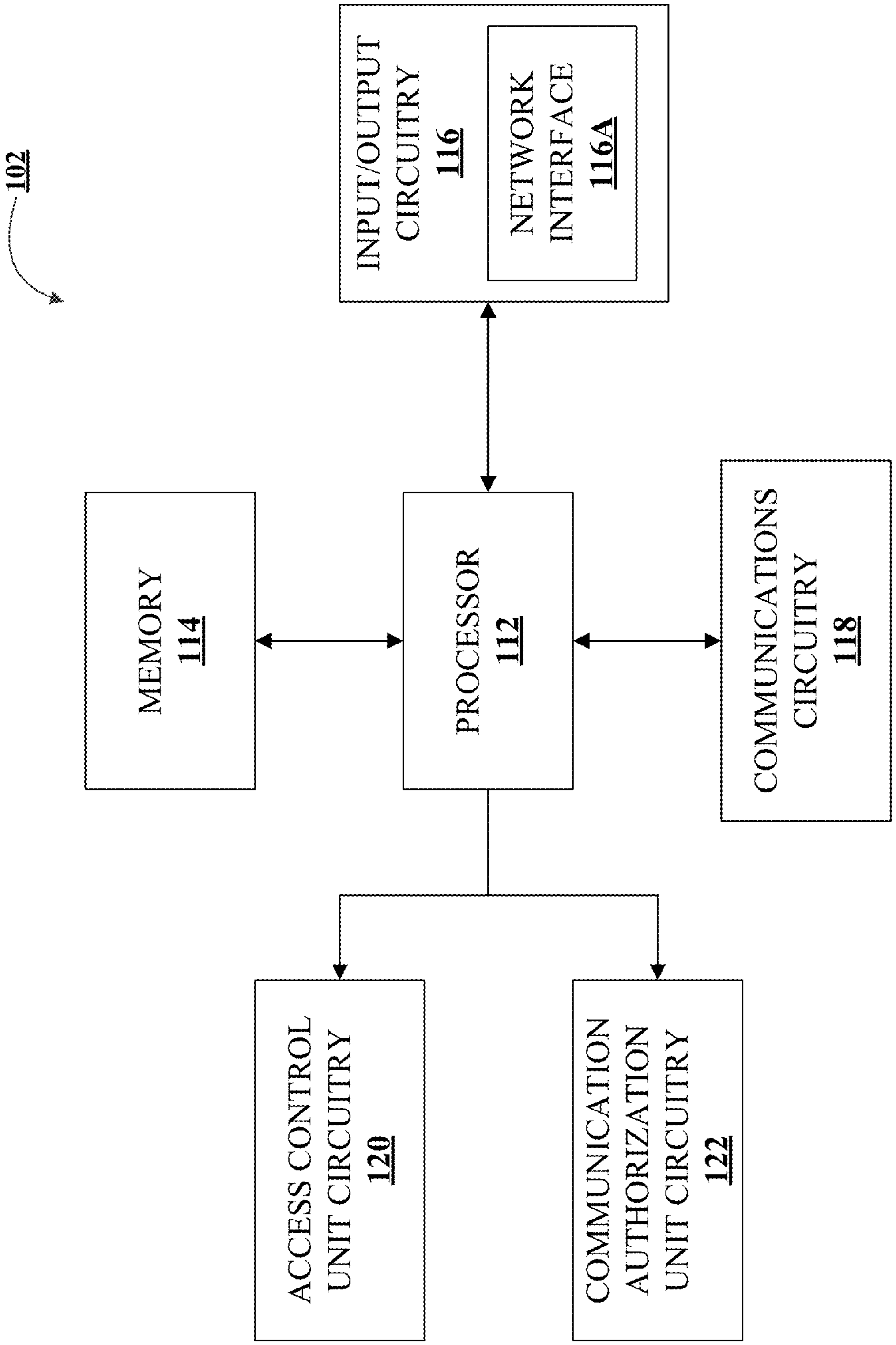
FIG. 2 illustrates example endpoint device circuitry for secure data transmission, in accordance with an embodiment of the present disclosure.

FIG. 2 illustrates example endpoint device 102 circuitry for secure data transmission, in accordance with an embodiment of the present disclosure. As described herein, the plurality of endpoint devices 102, 104, 106, 108 may embody the same or substantially similar structural configurations. Therefore, while the ensuing description focuses on the device circuitry of the Endpoint Device_A 102, it is to be understood that other endpoint devices (e.g., Endpoint Device_B 104, Endpoint Device_C 106, and/or Endpoint Device_D 108) may possess an analogous or essentially equivalent device circuitry. This parallelism in structure and function among the plurality of endpoint devices 102, 104, 106, 108 implies that descriptions, illustrations, and technical details pertaining to the device circuitry of the Endpoint Device_A 102 are equally applicable and representative of the other endpoint devices, unless otherwise specified.

As shown in FIG. 2, the Endpoint Device_A 102 may include a processor 112, a memory 114, input/output circuitry 116, communications circuitry 118, access control unit circuitry 120, and communication authorization unit circuitry 122.

Although the term "circuitry" as used herein with respect to components 112-122 is described in some cases using functional language, it should be understood that the particular implementations necessarily include the use of particular hardware configured to perform the functions associated with the respective circuitry as described herein. It should also be understood that certain of these components 112-122 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the Endpoint Device_A 102 may be housed together, while other components are housed separately (e.g., a controller in communication with the Endpoint Device_A 102). While the term "circuitry" should be understood broadly to include hardware, in some embodiments, the term "circuitry" may also include software for configuring the hardware. For example, in some embodiments, "circuitry" may include processing circuitry, storage media, network interfaces, input/output devices, and the like. In some embodiments, other elements of the Endpoint Device_A 102 may provide or supplement the functionality of particular circuitry. For example, the processor 112 may provide processing functionality, the memory 114 may provide storage functionality, the communications circuitry 118 may provide network interface functionality, and the like.

In some embodiments, the processor 112 (and/or co-processor or any other processing circuitry assisting or otherwise associated with the processor) may be in communication with the memory 114 via a bus for passing information among components of, for example, the Endpoint Device_A 102. The memory 114 may be non-transitory and may include, for example, one or more volatile and/or non-volatile memories, or some combination thereof. In other words, for example, the memory 114 may be an electronic storage device (e.g., a non-transitory computer readable storage medium). The memory 114 may be configured to store information, data, content, applications, instructions, or the like, for enabling an apparatus, e.g., the Endpoint Device_A 102, to carry out various functions in accordance with example embodiments of the present disclosure.

Although illustrated in FIG. 2 as a single memory, the memory 114 may comprise a plurality of memory components. The plurality of memory components may be embodied on a single computing device or distributed across a plurality of computing devices. In various embodiments, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the Endpoint Device_A 102 to carry out various functions in accordance with example embodiments discussed herein. For example, in at least some embodiments, the memory 114 may be configured to buffer data for processing by the processor 112. Additionally, or alternatively, in at least some embodiments, the memory 114 may be configured to store program instructions for execution by the processor 112. The memory 114 may store information in the form of static and/or dynamic information. This stored information may be stored and/or used by the Endpoint Device_A 102 during the course of performing its functionalities.

The processor 112 may be embodied in a number of different ways and may, for example, include one or more processing devices configured to perform independently. Additionally, or alternatively, the processor 112 may include one or more processors configured in tandem via a bus to enable independent execution of instructions, pipelining, and/or multithreading. The processor 112 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, the processor 112 may include a plurality of processors. The plurality of processors may be embodied on a single computing device or may be distributed across a plurality of such devices collectively configured to function as the Endpoint Device_A 102. The plurality of processors may be in operative communication with each other and may be collectively configured to perform one or more functionalities of the Endpoint Device_A 102 as described herein.

In an example embodiment, the processor 112 may be configured to execute instructions stored in the memory 114 or otherwise accessible to the processor 112. Alternatively, or additionally, the processor 112 may be configured to execute hard-coded functionality. As such, whether configured by hardware or software methods, or by a combination thereof, the processor 112 may represent an entity (e.g., physically embodied in circuitry) capable of performing operations according to an embodiment of the present disclosure while configured accordingly. Alternatively, as another example, when the processor 112 is embodied as an executor of software instructions, the instructions may specifically configure the processor 112 to perform one or more algorithms and/or operations described herein when the instructions are executed. For example, these instructions, when executed by the processor 112, may cause the Endpoint Device_A 102 to perform one or more of the functionalities thereof, as described herein.

In some embodiments, the Endpoint Device_A 102 may further include input/output circuitry 116 that may, in turn, be in communication with the processor 112 to provide an audible, visual, mechanical, or other output and/or, in some embodiments, to receive an indication of an input from a user or another source. In that sense, the input/output circuitry 116 may include means for performing analog-to-digital and/or digital-to-analog data conversions. The input/output circuitry 116 may include support, for example, for a display, touchscreen, keyboard, mouse, image capturing device (e.g., a camera), microphone, and/or other input/output mechanisms. The input/output circuitry 116 may include a user interface and may include a web user interface, a mobile application, a kiosk, or the like.

In some embodiments, the input/output circuitry 116 may include a network interface 116A configured to receive a communication request from a peer endpoint device within the network. The network interface 116A may support various communication protocols, such as Ethernet, Wi-Fi, Bluetooth, or other wireless and wired communication standards, to facilitate the exchange of data packets across the network. The network interface 116A may also include capabilities for handling high-speed data transfer, error checking, and correction, as well as encryption and decryption of data. Additionally, the network interface 116A may be capable of managing multiple simultaneous connections, allowing Endpoint Device_A 102 to communicate with several peer devices concurrently. In some embodiments, the network interface 116A may also support virtualization, enabling logical partition of resources to handle different types of traffic or to separate traffic for different virtual machines or processes running on the endpoint device. In some embodiments, the network interface 116A may be separate from the input/output circuitry 116, allowing for dedicated handling of network communications. The network interface 116A, when implemented as a separate module, can be designed with specialized hardware and firmware specifically optimized for networking tasks, such as packet processing, filtering, and routing.

The processor 112 and/or user interface circuitry comprising the processor 112 may be configured to control one or more functions of a display or one or more user interface elements through computer-program instructions (e.g., software and/or firmware) stored on a memory accessible to the processor 112 (e.g., the memory 114, and/or the like). In some embodiments, aspects of input/output circuitry 116 may be reduced as compared to embodiments where the Endpoint Device_A 102 may be implemented as an end-user machine or other type of device designed for complex user interactions. In some embodiments (like other components discussed herein), the input/output circuitry 116 may be eliminated from the Endpoint Device_A 102. The input/output circuitry 116 may be in communication with memory 114, communications circuitry 118, and/or any other component(s), such as via a bus. Although more than one input/output circuitry and/or other component can be included in the Endpoint Device_A 102, only one is shown in FIG. 2 to avoid overcomplicating the disclosure (e.g., as with the other components discussed herein).

The communications circuitry 118, in some embodiments, includes any means, such as a device or circuitry embodied in either hardware, software, firmware or a combination of hardware, software, and/or firmware, that is configured to receive and/or transmit data from/to a network and/or any other device, circuitry, or module associated therewith. In this regard, the communications circuitry 118 may include, for example, a network interface for enabling communications with a wired or wireless communication network. For example, in some embodiments, communications circuitry 118 may be configured to receive and/or transmit any data that may be stored by the memory 114 using any protocol that may be used for communications between computing devices. For example, the communications circuitry 118 may include one or more communication ports, network interface cards, antennae, transmitters, receivers, buses, switches, routers, modems, and supporting hardware and/or software, and/or firmware/software, or any other device suitable for enabling communications via a network. Additionally, or alternatively, in some embodiments, the communications circuitry 118 may include circuitry for interacting with the antenna(s) to cause transmission of signals via the antenna (e) or to handle receipt of signals received via the antenna (e). These signals may be transmitted by the Endpoint Device_A 102 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 118 may additionally or alternatively be in communication with the memory 114, the input/output circuitry 116, and/or any other component of the Endpoint Device_A 102, such as via a bus. The communication circuitry 118 of the Endpoint Device_A 102 may also be configured to receive and transmit information to and from the various components associated therewith.

The access control unit circuitry 120 may implement a set of rules (e.g., ACS) that govern how data packets are routed and how communication requests are processed. In specific embodiments, the access control unit circuitry 120 may determine whether a communication request from a peer endpoint device is IDE qualified, as described in further detail in FIG. 4. In this regard, the access control unit circuitry 120 may check whether the communication request has met specific criteria established by the IDE mechanism. As described herein, IDE qualification typically requires successful implementation of certain IDE components, such as key setup and exchange, to ensure data integrity and secure communication. If a communication request is not IDE qualified and the device has been configured to required IDE qualification for peer-to-peer communication requests, the access control unit circuitry 120 may block or redirect the request, such that only secure and authorized communications are allowed.

The communication authorization unit circuitry 122 may establish secure communication protocols and verifying the authenticity of communication requests between endpoint devices within the network. In this regard, the communication authorization unit circuitry 122 may perform a key setup and exchange process with the peer endpoint device prior to receiving any communication requests, as described in detail in FIG. 4. Alternatively, or additionally, the communication authorization unit circuitry 122 may handle the verification of the authenticity of each communication request received from a peer endpoint device, as described in detail in FIG. 4.

In some embodiments, the Endpoint Device_A 102 may include hardware, software, firmware, and/or a combination of such components, configured to support various aspects of packet configuration circuitry as described herein. It should be appreciated that in some embodiments, the access control unit circuitry 120 and/or the communication authorization unit circuitry 122 may perform one or more of such example actions in combination with another circuitry of the Endpoint Device_A 102, such as the memory 114, processor 112, input/output circuitry 116, and/or communications circuitry 118. For example, in some embodiments, the access control unit circuitry 120 and/or the communication authorization unit circuitry 122 may utilize the processing circuitry, such as the processor 112 and/or the like, to form a self-contained subsystem to perform one or more of its corresponding operations. In a further example, and in some embodiments, some or all of the functionality of the access control unit circuitry 120 and/or the communication authorization unit circuitry 122 may be performed by the processor 112. In this regard, some or all of the example processes and algorithms discussed herein can be performed by at least one processor 112, the access control unit circuitry 120 and/or the communication authorization unit circuitry 122. It should also be appreciated that, in some embodiments, the access control unit circuitry 120 and/or the communication authorization unit circuitry 122 may include a separate processor, specially configured FPGA, or ASIC to perform its corresponding functions. For example, the access control unit circuitry 120 and/or the communication authorization unit circuitry 122 may perform some or all of the functionality, such as, implementing ACS, by directly interfacing with other components, such as the communications circuitry 118, without relying on the processor 112.

Additionally, or alternatively, in some embodiments, the access control unit circuitry 120 may use the memory 114 to store collected information. For example, in some implementations, the access control unit circuitry 120 may include hardware, software, firmware, and/or a combination thereof, that interacts with the memory 114 to send, retrieve, update, and/or store data.

Accordingly, non-transitory computer readable storage media, which may, for example, be the memory 114, can be configured to store firmware, one or more application programs, and/or other software, which include instructions and/or other computer-readable program code portions that can be executed to direct operation of the Endpoint Device_A 102 to implement various operations, including the examples described herein. As such, a series of computer-readable program code portions may be embodied in one or more computer-program products and can be used, with a device, Endpoint Device_A 102, database, and/or other programmable apparatus, to produce the machine-implemented processes discussed herein. It is also noted that all or some of the information discussed herein can be based on data that is received, generated and/or maintained by one or more components of the Endpoint Device_A 102. In some embodiments, one or more external systems (such as a remote cloud computing and/or data storage system) may also be leveraged to provide at least some of the functionality discussed herein.

It should be recognized that the structure of the Endpoint Device_A 102, as detailed herein, represents merely one embodiment among a multitude of potential configurations. This particular structure of the Endpoint Device_A 102 is delineated to demonstrate a specific arrangement and interaction of its components—encompassing data processing units, network interfaces, and packet configuration circuitry—that collectively contribute to its comprehensive network capabilities. However, this outlined configuration is not definitive or limiting. The structure of the Endpoint Device_A 102 and its integral components can be varied to adapt to different networking paradigms, technological evolutions, and specific application needs. Alternative embodiments of the Endpoint Device_A 102 might employ varying types of processors, such as advanced multi-core CPUs or specialized GPUs, distinct networking interfaces like SmartNICs or advanced wireless modules, and diverse methods for managing network events and communications. Moreover, the scalability, data handling techniques, and network integration approaches of the Endpoint Device_A 102 can substantially differ based on targeted operational environments and functional requisites. Thus, while the present disclosure depicts one potential structure for the Endpoint Device_A 102, it is to be understood that this represents just one exemplification within the broader realm of network-enabled devices. The scope of the disclosure is, therefore, not confined to this singular form but is extendable to various other forms, technologies, and configurations.

Example System Including a PCIe Network in a Datacenter Environment

Figure 3:
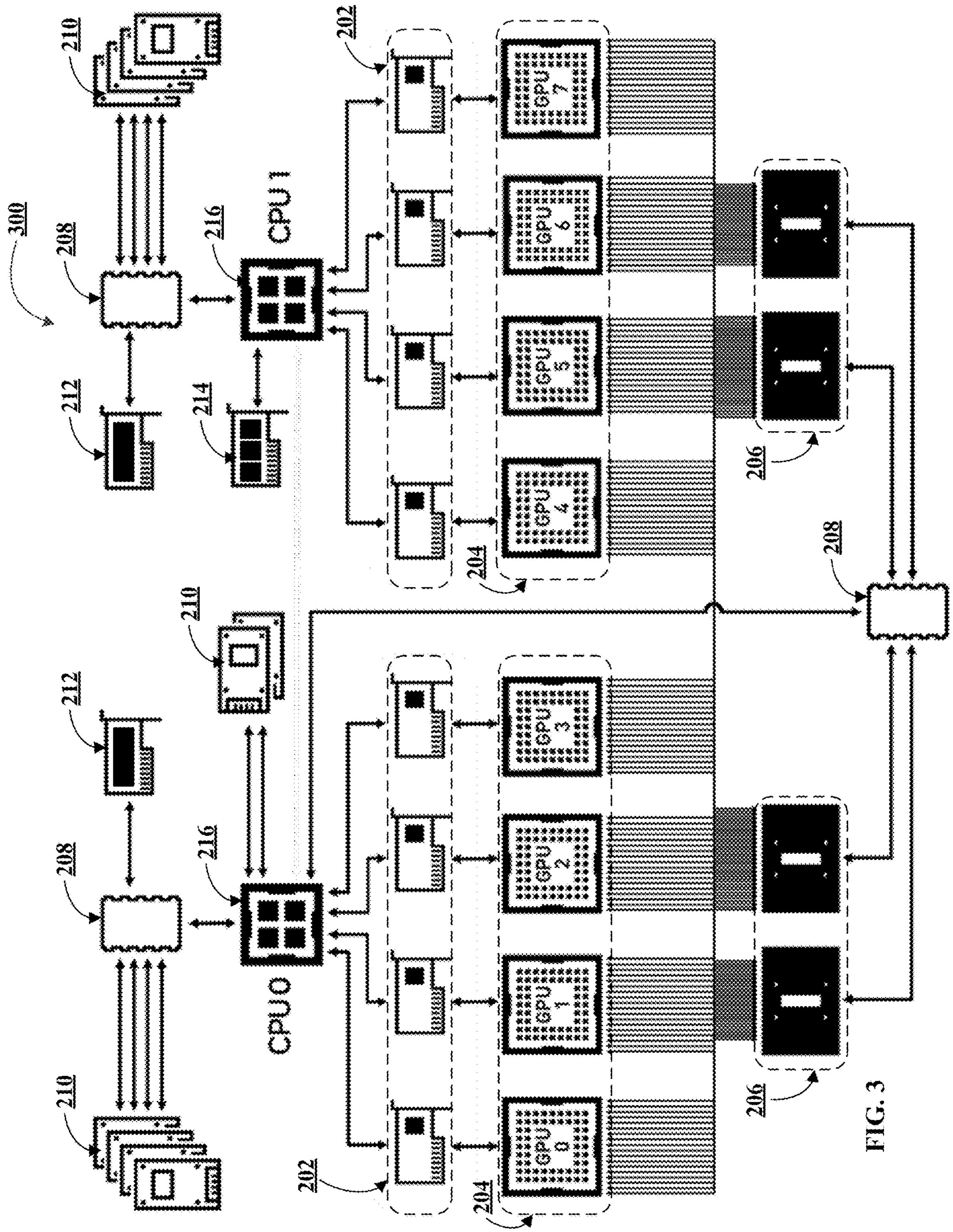
FIG. 3 illustrates an example system including a PCIe network in a datacenter environment, in accordance with an embodiment of the disclosure.

FIG. 3 illustrates an example system 300 in a datacenter environment, in accordance with an embodiment of the disclosure. As shown in FIG. 3, the system 300 may include: CPUs 216 (e.g., CPU 0 and CPU 1), which may serve as central control units managing data flow and processing tasks across various connected components; GPUs 204 (e.g., GPUs 0-7), which may be utilized for parallel processing and data-intensive operations, linked through high-bandwidth interconnect devices 206 (e.g., NVSwitch) to facilitate efficient GPU-to-GPU communication; storage devices 210 (e.g., NVMe), which may provide high-speed access to non-volatile memory, ensuring rapid data retrieval and storage; and network interface cards (NICs) 212 (e.g., ConnectX-7), 202 (e.g., ConnectX-7 Network Module), and 214 (e.g., 100 GbE), which enable external and internal data transfer, supporting multiple communication protocols such as Ethernet, Infiniband, NVLINK, chip-to-chip protocols, and Ground Reference Signaling, to ensure connectivity throughout the datacenter.

The PCIe switches 208 (e.g., intermediate switches 110 in FIG. 1), may serve as central routing points that manage data traffic between the interconnected devices within the PCIe fabric. The PCIe switches 208 may allow endpoint devices, such as GPUs 204, storage 210, and NICs 212, 202, 214, to communicate directly with each other, bypassing the need for CPU 216 mediation and optimizing overall network performance. As shown in FIG. 3, the components within the system 300 may be interconnected via PCIe links, facilitating direct communication between various endpoint devices. For instance, the CPUs 216 (e.g., CPU 0 and CPU 1) may be connected to their respective PCIe switches 208 via PCIe links. The PCIe switches 208 may serve as central hubs that route data traffic between other devices in the network. The GPUs 204 (e.g., GPUs 0-7) may be linked to the PCIe switches 208 via PCIe links, enabling high-speed communication pathways essential for parallel processing and data-intensive tasks. Similarly, NVMe storage devices 210 may be connected to the PCIe switches 208 through PCIe links, providing a low-latency path for high-speed data retrieval and storage. NICs, including 212 (ConnectX-7), 202 (ConnectX-7 Network Module), and 214 (100 GbE), may also be connected to the PCIe switches 208, allowing for seamless data transfer and external connectivity within the datacenter.

Within this system 300, embodiments of the disclosure may be implemented to improve the security of data transmissions between endpoint devices. By integrating specific components of the IDE framework, such as key setup and exchange, into the existing PCIe fabric (as described in detail in FIGS. 4 and 5), embodiments of the disclosure may provide a mechanism for verifying the security status of communication requests between devices. Such an approach may allow for secure data exchange without the need for full-scale encryption, thus maintaining the high-speed performance of the datacenter network while ensuring data integrity and confidentiality. Endpoint devices, such as GPUs, storage units, and NICs, can determine whether peer devices are IDE-qualified before authorizing communication, effectively preventing unauthorized access, thereby improving the overall security framework of the datacenter.

The system 300 depicted in FIG. 3 is provided merely as an illustrative example of a datacenter environment in which embodiments of the disclosure may be implemented. This configuration, which may include a specific arrangement and interconnection of components such as CPUs, GPUs, DPUs, NVMe storage devices, network interface cards, PCIe switches, NVLINK switches, network switches, and high-bandwidth interconnect devices, is not intended to limit the scope of the disclosure to any particular hardware, topology, or configuration. The described network components and their interrelationships are exemplary and should be understood to represent one possible implementation environment for the disclosure. Embodiments of the disclosure may be employed in other types of interconnect architectures, configurations, or data processing environments, whether employing PCIe or other similar communication protocols and components. Variations in the arrangement of elements, interconnect types, and operational features are contemplated and within the scope of the disclosure and not limited to the specific illustrative embodiments disclosed herein.

Example Method for Secure Data Transmission

Figure 4:
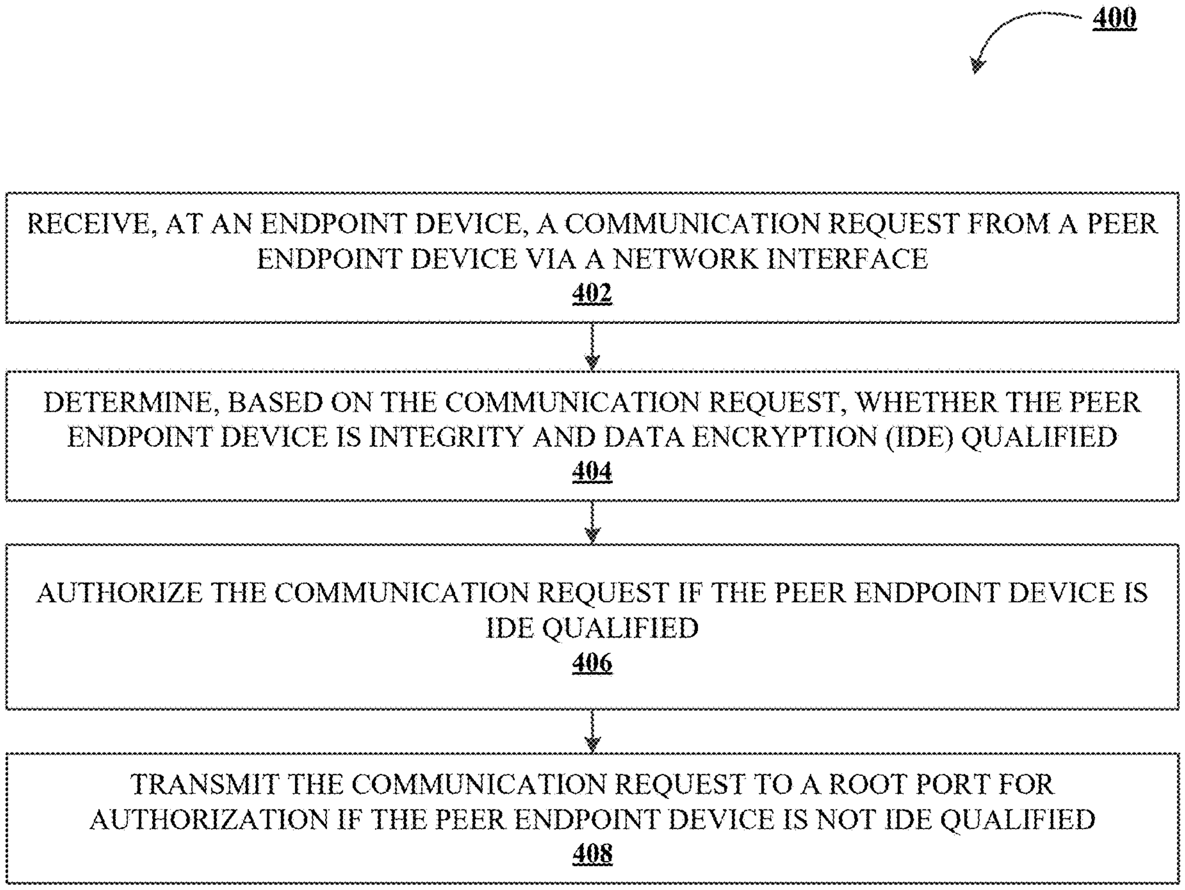
FIG. 4 illustrates an example method for secure data transmission, in accordance with an embodiment of the disclosure.

FIG. 4 illustrates an example method 400 for secure data transmission, in accordance with an embodiment of the disclosure. As shown in block 402, an endpoint device may receive a communication request from a peer endpoint device via a network interface. As described in FIGS. 1 and 2, the network interface may be configured to support multiple communication protocols and handling various data packet types, such as TLPs within a PCIe fabric. In an example embodiment, upon receipt of the communication request, the network interface may perform an initial check to identify the source of the request and determine its intended destination. In this regard, the network interface may examine the header information of the data packets (associated with the communication request) to verify the source and destination addresses. Additionally, the network interface may assess the integrity of the data packets such that they are not corrupted or altered in transit.

As shown in block 404, based on the communication request, a determination is made as to whether the peer endpoint device is IDE qualified. In some embodiments, the determination as to whether the peer endpoint device is IDE qualified is made if the endpoint device is specifically configured to enable the ACS service requiring IDE qualification. IDE is a mechanism developed to secure data transmission within interconnect frameworks by maintaining data integrity and confidentiality during communication between endpoint devices. IDE typically involves several components, including encryption of data packets, key setup and exchange, and state tracking, all of which collectively work to protect data from unauthorized access and tampering. The encryption component of IDE ensures that data remains unreadable to unauthorized entities, while the key setup and exchange process involves establishing a secure exchange of cryptographic keys between devices. State tracking further monitors the status of these security measures to prevent breaches or unauthorized communication attempts. In the context of determining whether an endpoint device is IDE qualified, the focus may be primarily on the implementation of specific IDE components, such as the key setup and exchange process, without requiring the endpoint device to perform the full suite of IDE functions, particularly the computationally intensive encryption of data. This is because the encryption process, while effective in securing data, introduces significant performance overhead and increases power consumption. By focusing on key setup and exchange, an endpoint device can still achieve a high level of security such that only devices that have successfully completed these key exchanges are permitted to communicate.

However, IDE qualification may not be limited to the key setup and exchange process alone. Other components of the IDE framework that offer comparable security assurances, such as device authentication mechanisms or data integrity verification processes, may also be utilized to determine whether an endpoint device meets the criteria for IDE qualification. As such, the scope of IDE qualification may include any IDE component or combination of components that achieves these security objectives while avoiding the performance and power consumption penalties associated with full-scale IDE encryption.

Determining whether an endpoint device is IDE qualified may be integrated as part of the ACS framework, as described in FIG. 1. In an example embodiment, IDE qualification may refer to the successful implementation of specific IDE components, such as key setup and exchange (described in further detail in FIG. 5), for maintaining secure communications within the network. In this regard, the determination process may include verifying that the peer endpoint device has completed the required IDE key setup and exchange with the receiving endpoint device prior to sending the communication request. If the endpoint device has conducted these IDE procedures, it may be deemed IDE-qualified, verifying that the devices that have met the necessary security prerequisites can engage in data exchange. In this way, the IDE qualified feature may address the limitations of current ACS I/O Request Blocking and ACS Direct Translated Peer-to-Peer mechanisms by incorporating IDE-matching capabilities. Additionally, setting an "IDE-qualified" bit within the endpoints helps verify that an expected Routing ID (RID) is securely associated with the corresponding traffic stream ID, further reinforcing the security framework.

As shown in block 406, if the peer endpoint device is IDE qualified, the communication request is authorized. If the peer endpoint device is determined to be IDE-qualified, the receiving endpoint device may proceed to authorize the communication request. Authorization may involve allowing the peer endpoint device to establish a communication channel and transmit data across the network. Authorization may include updating access control lists or routing tables to reflect the authorized status of the peer endpoint device and verifying that any data exchange adheres to predefined security policies. Authorization may also trigger the establishment of a secure communication session, where encryption and data integrity checks are enforced to protect the transmitted data from unauthorized access or tampering. By authorizing only IDE-qualified devices, a high level of security may be maintained to permit peer-to-peer communication.

As shown in block 408, if the peer endpoint device is not IDE qualified, transmit the communication request to a root port for authorization. If the peer endpoint device is determined not to be IDE-qualified, the communication request may not be immediately authorized. Instead, the communication request may be transmitted to a root port associated with the root complex for further authorization. As described in FIG. 1, the root port may serve as a control point within the PCIe fabric that manages communications and enforces security protocols for devices connected to the network. By routing the communication request to the root port, an additional layer of security may be introduced, allowing the root complex to perform more stringent checks and validations on the requesting device. Doing so may involve verifying device credentials, evaluating access permissions, and applying encryption or data integrity mechanisms to safeguard the communication, verifying that only devices meeting the required security standards are permitted to communicate within the network, thereby preventing unauthorized access and potential security breaches. As such, new rules for managing "disallowed" transactions may also be established in alignment with PCIe ACS specifications, such that that only expected RIDs are transmitted from each endpoint, thereby improving the granularity and security of inter-device communication within the high-speed interconnect environment. Alternatively, if the peer endpoint device is not IDE qualified, the communication request may be denied by the endpoint device. In other words, the communication request may be dropped, with or without signaling an error condition.

Example Method for Key Setup and Exchange at an Endpoint Device

Figure 5:
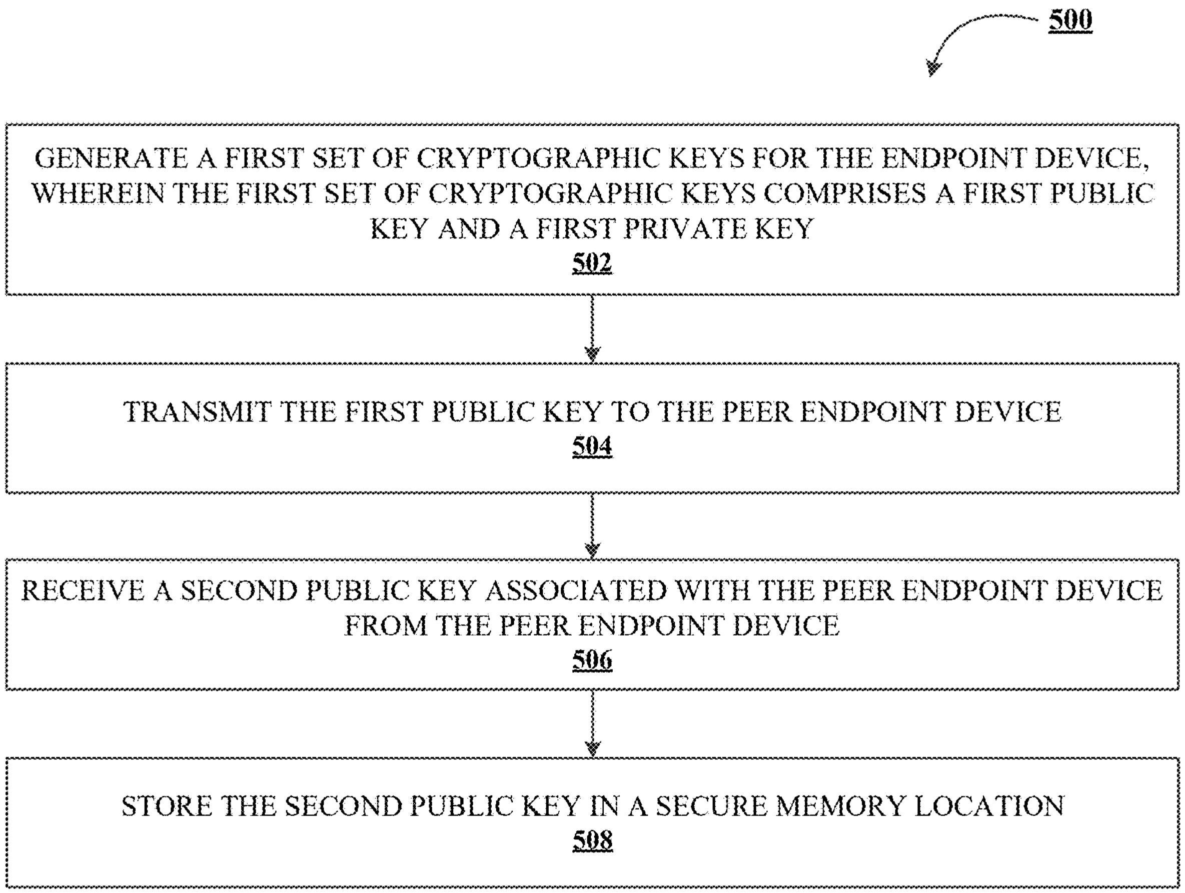
FIG. 5 illustrates an example method for key setup and exchange, in accordance with an embodiment of the disclosure.

FIG. 5 illustrates an example method 500 for key setup and exchange, in accordance with an embodiment of the disclosure. As shown in block 502, a first set of cryptographic keys is generated for the endpoint device, wherein the first set of cryptographic keys comprises a first public key and a first private key. The endpoint device may utilize a cryptographic algorithm, such as RSA (Rivest-Shamir-Adleman), ECC (Elliptic Curve Cryptography), or another suitable key generation protocol to create these keys. The public key may be configured to be shared openly with other devices, while the private key is kept secret and secure within the endpoint device. The key generation process may involve a random number generator (RNG) to generate keys are unique and unpredictable, enhancing security. Once generated, the private key may be stored in a secure memory location within the endpoint device, such as a hardware security module (HSM) or a trusted platform module (TPM), to protect against tampering or unauthorized access.

As shown in block 504, the first public key is transmitted to the peer endpoint device. The transmission of the public key can be done over a secure channel, using protocols such as Transport Layer Security (TLS) or Secure Socket Layer (SSL) to verify the integrity and confidentiality of the key during transit. The public key may be transmitted as part of a handshake process, where the endpoint device sends the key along with other identifying information, such as its device ID or certificate, to authenticate itself to the peer endpoint device. The public key may be shared in an unencrypted form since it is not sensitive information by itself; however, verifying that the transmission is secure prevents potential attackers from tampering with or replacing the public key.

As shown in block 506, a second public key that is associated with the peer endpoint device is received from the peer endpoint device. The reception of the second public key may also be part of the same handshake process, where both devices exchange their public keys to initiate a secure session. Upon receiving the second public key, the endpoint device may verify its authenticity by checking it against a certificate authority (CA) or a trusted third party to ensure that the key genuinely belongs to the peer endpoint device and has not been altered or intercepted by a malicious entity. The verification process may help prevent man-in-the-middle (MITM) attacks, where an attacker could impersonate the peer endpoint device by sending a forged public key.

As shown in block 508, the second public key is stored in a secure memory location. The secure memory location could be in a dedicated secure element, a TPM, or an HSM, which provides robust protection against unauthorized access, tampering, or physical attacks. The secure memory location may verify that only authorized processes within the endpoint device can access or use the stored public key.

In specific embodiments, the key setup and exchange process may include the creation of shared secret keys between an endpoint device and a peer endpoint device. The secret keys may be used to establish a secure communication channel. Shared secret keys may be generated through cryptographic techniques that combine the private key of one endpoint device with the public key of another, ensuring that both devices can independently compute a matching shared secret key without ever transmitting the actual secret over the network. In this process, the endpoint device may first generate a shared secret key using its private key (e.g., first private key) and the public key of the peer endpoint device (e.g., second public key). The operation may rely on algorithms such as Diffie-Hellman or Elliptic Curve Diffie-Hellman (ECDH), which provide a secure way to compute a shared secret over an insecure channel. By using its private key and the peer's public key, the endpoint device may generate a first shared secret key that can only be duplicated by the peer endpoint device if it uses its corresponding private key and the public key of the endpoint device.

After generating the first shared secret key, the endpoint device may transmit this key to the peer endpoint device. Concurrently, the peer endpoint device may generate its own shared secret key using its private key and the public key of the initial endpoint device. Upon receiving the first shared secret key, the peer endpoint device may verify that both generated shared secret keys match. Because both keys are derived from the same set of public and private keys, they should match if both devices have correctly implemented the cryptographic procedures. If the first shared secret key generated by the endpoint device matches the second shared secret key generated by the peer endpoint device, a secure communication channel can be established between the two endpoint devices. The secure channel allows encrypted data transmission, such that only authorized devices can access the transmitted information. The successful creation and matching of shared secret keys demonstrate that both devices have verified each other's identity and possess the necessary cryptographic keys to engage in secure communication. As such, determining that a peer endpoint device is IDE qualified may involve verifying the successful establishment of a secure communication channel based on matching shared secret keys. If the secure channel is established, it indicates that the peer endpoint device has correctly performed the key exchange and generated the necessary shared secret keys.

The key setup and exchange process outlined herein is a component of the IDE mechanism and serves as an example of an IDE component used to determine whether a peer endpoint device is IDE qualified. As described herein, the process involves generating cryptographic keys, exchanging public keys, verifying the authenticity of the received keys, and securely storing these keys. By completing these steps, the endpoint devices may establish a secure basis for communication. As such, to determine if a peer endpoint device is IDE qualified, the endpoint devices must have successfully completed the key setup and exchange process. However, the key setup and exchange is only one possible component of the IDE framework. Other IDE components can also be used instead of or in addition to the key setup and exchange to meet IDE qualification criteria. The selection of IDE components for determining IDE qualification may depend on the specific security needs of the network environment. Some environments may require multiple IDE components to provide a comprehensive security approach, while others may focus on a single component, such as key setup and exchange, to minimize overhead. The goal is to ensure that only devices meeting the required security standards are allowed to communicate.

In addition, in specific embodiments, when a communication request is received from a peer endpoint device, the endpoint device may extract a digital signature embedded in the request. The digital signature may be created by the peer endpoint device by hashing the contents of the communication request and then encrypting the hash using its own private key (e.g., the second private key). The purpose of the digital signature is to provide a way to verify both the integrity of the data and the authenticity of the sender. The endpoint device may then use the second public key, which was obtained during the key exchange process, to decrypt the digital signature. Decrypting the digital signature with the peer's public key may reveal the transmitted hash, which was originally computed by the peer endpoint device. Next, the endpoint device may independently compute its own hash (e.g., computed hash) of the received communication request using the same cryptographic hash function. The endpoint device may then compare the transmitted hash, which was decrypted from the digital signature, with the computed hash generated from the received data. If the two hashes match, it confirms that the communication request has not been altered in transit and is indeed from the peer endpoint device, thus verifying the authenticity of the request. If the hashes do not match, it suggests that the data has been tampered with or that the sender is not who they claim to be, prompting the endpoint device to reject the communication request or take additional security measures.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases the method may include additional steps. The steps and modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A verifying endpoint device configured for secure data transmission, the verifying endpoint device comprising:
a memory storing a first private key;
a network interface configured to receive a communication request from a peer endpoint device;
a communication authorization unit configured to:
generate a first shared secret key based at least in part on (i) the first private key and (ii) a second public key received from the peer endpoint device, and
provide the first shared secret key to the peer endpoint device,
an access control unit operatively coupled to the network interface, and configured to:
determine the peer endpoint device is Integrity and Data Encryption (IDE) qualified based at least in part on (i) the first shared secret key and (ii) a second shared secret key generated by the peer endpoint device, wherein the second shared secret key is generated based at least in part on a first public key of the verifying endpoint device and a second private key of the peer endpoint device,
in a first instance in which the peer endpoint device is IDE qualified, authorize the communication request, and
in a second instance in which the peer endpoint device is not IDE qualified, transmit the communication request to a root port to authorize the communication request.

2. The verifying endpoint device of claim 1, wherein the communication authorization unit is configured to:
establish a key setup and exchange component with the peer endpoint device prior to receiving the communication request from the peer endpoint device,
wherein determining that the peer endpoint device is IDE qualified comprises determining that the key setup and exchange component is established.

3. The verifying endpoint device of claim 2, wherein, in establishing the key setup and exchange component, the communication authorization unit is further configured to:
generate a first set of cryptographic keys for the verifying endpoint device, wherein the first set of cryptographic keys comprises the first public key and the first private key;
transmit the first public key to the peer endpoint device;
receive, from the peer endpoint device, the second public key associated with the peer endpoint device; and
store the second public key in a secure memory location.

4. The verifying endpoint device of claim 3, wherein the communication authorization unit is further configured to:
extract a digital signature associated with the peer endpoint device from the communication request;
decrypt the digital signature associated with the peer endpoint device using the second public key to obtain a transmitted hash associated with the communication request;
determine a computed hash associated with the communication request; and
in a third instance in which the transmitted hash matches the computed hash, determine that the communication request is authentic.

5. The verifying endpoint device of claim 3, wherein the communication authorization unit is further configured to:
generate the first shared secret key based at least in part on the first private key and the second public key;
transmit the first shared secret key to the peer endpoint device;
receive, from the peer endpoint device, the second shared secret key associated with the peer endpoint device, wherein the second shared secret key is generated using the first public key and the second private key at the peer endpoint device; and
establish a secure communication channel between the verifying endpoint device and the peer endpoint device based at least in part on the first shared secret key and the second shared secret key,
wherein the first shared secret key matches the second shared secret key, and
wherein determining that the peer endpoint device is IDE qualified comprises determining that the secure communication channel is established.

6. The verifying endpoint device of claim 1, wherein the access control unit is further configured to:
deny the communication request in the second instance in which the peer endpoint device is not IDE qualified.

7. The verifying endpoint device of claim 1, wherein the access control unit is further configured to authorize the communication request with the peer endpoint device according to a peer-to-peer model.

8. The verifying endpoint device of claim 7, wherein authorizing the communication request according to the peer-to-peer model comprises excluding communication with other peer devices.

9. A method for secure data transmission, the method comprising:
storing a first private key in a memory of a verifying endpoint device,
receiving, at the verifying endpoint device, a communication request from a peer endpoint device via a network interface;
generating a first shared secret key based at least in part on (i) the first private key and (ii) a second public key received from the peer endpoint device;
providing the first shared secret key to the peer endpoint device;
determining the peer endpoint device is Integrity and Data Encryption (IDE) qualified based at least in part on (i) the first shared secret key and (ii) a second shared secret key generated by the peer endpoint device, wherein the second shared secret key is generated based at least in part on a first public key of the verifying endpoint device and a second private key of the peer endpoint device;
authorizing the communication request if the peer endpoint device is IDE qualified; and
transmitting the communication request to a root port for authorization if the peer endpoint device is not IDE qualified.

10. The method of claim 9, further comprising:
establishing a key setup and exchange component with the peer endpoint device prior to receiving the communication request from the peer endpoint device,
wherein determining that the peer endpoint device is IDE qualified comprises determining that the key setup and exchange component is established.

11. The method of claim 10, wherein in establishing the key setup and exchange component, the method further comprises:

generating a first set of cryptographic keys for the verifying endpoint device, wherein the first set of cryptographic keys comprises the first public key and the first private key;

transmitting the first public key to the peer endpoint device;

receiving the second public key associated with the peer endpoint device from the peer endpoint device; and storing the second public key in a secure memory location.

12. The method of claim 11, wherein the method further comprises:

extracting a digital signature associated with the peer endpoint device from the communication request;

decrypting the digital signature associated with the peer endpoint device using the second public key to obtain a transmitted hash associated with the communication request;

determining a computed hash associated with the communication request; and in an instance in which the transmitted hash matches the computed hash, determining that the communication request is authentic.

13. The method of claim 11, wherein the method further comprises:

generating the first shared secret key based at least in part on the first private key and the second public key;

transmitting the first shared secret key to the peer endpoint device;

receiving, from the peer endpoint device, the second shared secret key associated with the peer endpoint device, wherein the second shared secret key is generated using the first public key and the second private key at the peer endpoint device; and establishing a secure communication channel between the verifying endpoint device and the peer endpoint device based at least in part on the first shared secret key and the second shared secret key, wherein the first shared secret key matches the second shared secret key, and wherein determining that the peer endpoint device is IDE qualified comprises determining that the secure communication channel is established.

14. The method of claim 9, wherein the method further comprises:

denying the communication request in an instance in which the peer endpoint device is not IDE qualified.

15. The method of claim 9, wherein the method further comprises:

authorizing the communication request with the peer endpoint device according to a peer-to-peer model.

16. The method of claim 15, wherein authorizing the communication request according to the peer-to-peer model comprises excluding communication with other peer devices.

17. A computer program product for secure data transmission, the computer program product comprising one or more non-transitory computer-readable storage media storing instructions that, when executed by one or more processors, cause the one or more processors to perform operations comprising:

storing a first private key in a memory of a verifying endpoint device, receiving, at the verifying endpoint device, a communication request from a peer endpoint device;

generating a first shared secret key based at least in part on (i) the first private key and (ii) a second public key received from the peer endpoint device;

providing the first shared secret key to the peer endpoint device;

determining the peer endpoint device is Integrity and Data Encryption (IDE) qualified based at least in part on (i) the first shared secret key and (ii) a second shared secret key generated by the peer endpoint device, wherein the second shared secret key is generated based at least in part on a first public key of the verifying endpoint device and a second private key of the peer endpoint device;

in a first instance in which the peer endpoint device is IDE qualified, authorize the communication request; and in a second instance in which the peer endpoint device is not IDE qualified, transmit the communication request to a root port to authorize the communication request.

18. The computer program product of claim 17, wherein the operations further comprise:

establishing a key setup and exchange component with the peer endpoint device prior to receiving the communication request from the peer endpoint device, wherein determining that the peer endpoint device is IDE qualified comprises determining that the key setup and exchange component is established.

19. The computer program product of claim 18, wherein the operations further comprise:

generating a first set of cryptographic keys for the verifying endpoint device, wherein the first set of cryptographic keys comprises the first public key and the first private key;

transmitting the first public key to the peer endpoint device;

receiving, from the peer endpoint device, the second public key associated with the peer endpoint device; and storing the second public key in a secure memory location.

20. The computer program product of claim 19, wherein the operations further comprise:

extracting a digital signature associated with the peer endpoint device from the communication request;

decrypting the digital signature associated with the peer endpoint device using the second public key to obtain a transmitted hash associated with the communication request;

determining a computed hash associated with the communication request; and in a third instance in which the transmitted hash matches the computed hash, determining that the communication request is authentic.

* * * * *